United States Patent Office 3,557,043
Patented Jan. 19, 1971

3,557,043
POLYACRYLATE-URETHANE LACQUERS
Heinz Walter Krauss, Leverkusen, Josef Pedain, Cologne, Karl-Friedrich Zenner and Gunter Oertel, Cologne-Flittard, and Hans Holtschmidt, Leverkusen, Germany, assignors to Farbenfabriken Bayer Aktiengesellschaft, Leverkusen, Germany, a corporation of Germany
No Drawing. Filed Sept. 18, 1967, Ser. No. 668,698
Claims priority, application Germany, Sept. 19, 1966,
F 50,229
Int. Cl. C08q 37/32
U.S. Cl. 260—31.2                3 Claims

ABSTRACT OF THE DISCLOSURE

Lacquers suitable for motor vehicles and the like are prepared from mixtures of polyacrylate resins containing hydroxyl groups and N-alkoxymethylurethanes. The alkoxymethylurethanes bring about the cross-linking of the polyacrylate resin. In addition to the above mentioned ingredients, melamine formaldehyde or urea formaldehyde resins may be used jointly with the N-alkoxymethylurethanes.

This invention relates to lacquer compositions and more particularly to a lacquer composition comprised of a polyacrylate resin containing hydroxyl groups and an N-alkoxymethylurethane.

It has been heretofore known that lacquers which comprise a polyacrylate resin containing hydroxyl groups can be hardened with melamine resins at 120 to 140° C., usually in the presence of acids, and are suitable, e.g., for lacquering motor vehicles. These lacquers are particularly hard, and are resistant to scratching, deterioration under the action of light and weathering. One particular disadvantage, however, is their insufficient resistance to solvents, and in particular, high power fuels and their elasticity and impact strength at low temperatures is inadequate.

It is an object of this invention to provide improved lacquer compositions. It is another object of this invention to provide improved lacquer compositions having greater elasticity, impact strength and resistance to solvents. It is a still further object of this invention to provide improved polyacrylate lacquer compositions.

The foregoing objects and others which will become apparent from the following description are accomplished in accordance with the invention, generally speaking, by providing lacquer compositions from mixtures of polyacrylate resins containing hydroxyl groups and N-alkoxymethylurethanes. More particularly, the lacquer compositions, in accordance with this invention, contain from about 15 to about 35 parts by weight of a polyacrylate resin containing hydroxyl groups, from about 5 to about 30 parts by weight of an N-alkoxymethylurethane and from about 40 to about 80 parts of a suitable solvent. If desired, from about 0 to about 70% by weight of the N-alkoxymethylurethane may be replaced by a melamine formaldehyde and/or urea formaldehyde resins. The lacquer composition may contain, in addition, the usual lacquer additives such as plasticizers, leveling agents, pigments, fillers and acid catalysts.

Hydroxyl group-containing polyacrylate resins contained by the lacquer mixture according to the invention are already known. They are copolymers prepared by known polymerization processes from acrylic acid esters such as methyl methacrylate, ethyl methacrylate, methyl acrylate and higher alkyl esters of acrylic and methacrylic acid, for example, those having 2 to 12 carbon atoms in the alkyl ester group. Mono olefins or aromatic vinyl compounds may be used as additional components in the preparation of these copolymers.

The higher alkyl esters are preferably used in the process according to the invention as internal plasticizing components. Thus, for example, butyl acrylate or ethyl hexyl acrylate or -methacrylate are commonly used. The hydroxyl groups necessary for cross-linking are introduced by copolymerization of the acrylic or methacrylic acid alkyl esters, e.g., with hydroxypropyl methacrylate, hydroxyethyl acrylate or -methacrylate, or with mono- or diallyl ethers or di- or polyglycols. In order to increase the reactivity of these copolymers towards formaldehyde compounds, the hydroxyl group-containing polyacrylates may also contain amide groups and/or carboxyl groups obtained by copolymerization of the hydroxyl-containing compounds with acrylamide or methacrylamide and/or acrylic or methacrylic acid. A certain catalytic effect is also obtained by the incorporation by copolymerization of maleic acid or maleic acid semi esters, although such products have a slight tendency to yellowing in sunlight and in heat. In many products of this type, styrene or vinyl toluene is introduced as hardening component, so that a pure polyacrylate product is not obtained. However, since styrene and its homologues do not decisively change the overall properties of the products, the products are still known as polyacrylates. In order to obtain certain desired properties, the hydroxyl group-containing polyacrylates may also be mixed or blended with oil-containing or oil-free alkyl resins which contain hydroxyl groups. These polymers preferably have a molecular weight of between 50,000 and 300,000.

The term N-alkoxymethylurethanes as used in this invention, is taken to cover all N-alkoxymethylurethanes produced from low or high molecular weight polyalcohols. Such compounds may be obtained in part, by condensation of urethanes with formaldehyde and mono alcohols, although the use of products obtainable by known processes whereby isocyanates of the formula $$ROCH_2-NCO$$

wherein R is an alkyl or alkylene radical, preferably with 1–12 C-atoms are reacted with polyhydroxyl compounds, is to be preferred. Any suitable N-alkoxymethylisocyanate may be used, such as, for example, methoxymethylisocyanate, ethoxymethylisocyanate, isopropoxymethylisocyanate, butoxymethylisocyanate, hexyloxymethylisocyanate, allyloxymethylisocyanate and the like. Any suitable polyhydroxy compound may be used for the reaction such as low molecular weight polyalcohols, such as, ethylene glycol, 1,2-propylene glycol, 1,3-propylene glycol, butane-1,3-diol, hexanediol, 2,2-dimethylpropanediol, trimethylolpropane, glycerol, hexanetriol, sorbitol, pentaerythritol, mannitol and the like. One may also use ether glycols such as di-tri or octaethylene- and propylene glycol, thiodiglycol, hydroquinone-di-b-hydroxyethylether, N-methyldiethanolamine, triethanolamine or carboxylic esters, carbonamides or sulphonamides which contain hydroxyl groups, e.g., monoacetyl glycerol, dihydroxyethylmaleate, dihydroxyethylphthalate, dihydroxyethylamide of acetic acid, di-(N-methyl-N-b-hydroxy)-ethylamide of phthalic acid, tetrahydroxyethylamide of adipic acid, and dihydroxyethylamide of methanesulphonic acid. The reaction products obtained from the said low molecular weight polyhydroxy compounds and isocyanates represent poly-N-alkoxymethyl urethanes, and they will be referred to as such hereinafter. These compounds, of which a few are given by way of example in the following formulae

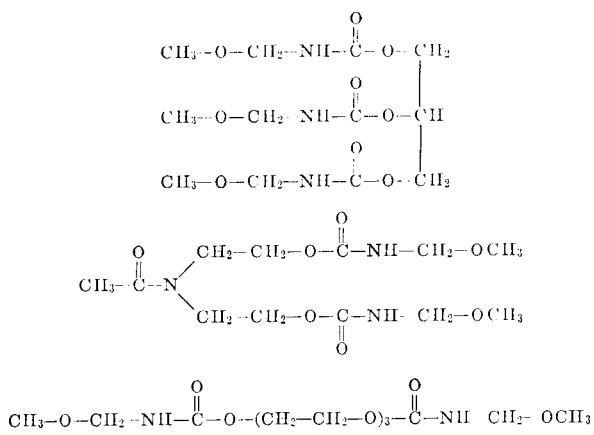

may be prepared by the action of the corresponding alkoxymethylisocyanates on polyhydroxyl compounds in the melt or in the presence of inert solvents or diluents.

The above-mentioned reaction products are preferably used because of the high degree of purity which may be achieved in their preparation, this high degree of purity having a particularly advantageous effect on the quality of the lacquer mixture prepared from them.

The alkoxymethylurethane used in the process according to the invention may also be the reaction products of high molecular weight polyhydroxy compounds having a molecular weight above 600 and alkoxymethylisocyanates.

The preparation of these compounds is fully described in U.S. copending application Ser. No. 524,467 now Pat. No. 3,480,591. In the said application there are also described the high molecular weight polyhydroxy compounds which may be used, for example the following: Hydroxyl group-containing polyesters of polycarboxylic acids such as phthalic acid, adipic acid or maleic acid, and polyalcohols such as ethylene glycol, hexanediol or glycerol, trimethylolpropane; hydroxyl group-containing polyethers of alkylene oxides such as ethylene-, propylene- or styrene oxide; hydroxyl group-containing acetals of formaldehyde and diols, such as butanediol and hexanediol; hydroxyl group-containing polyester amides of polycarboxylic acids, polyalcohols and polyamines, reaction products of polycarboxylic acids and amino alcohols such as ethanolamine or diethanolamine, and hydroxyl group-containing polyurethanes obtained by reaction between polyhydroxy compounds and polyisocyanates.

The poly-N-alkoxymethylurethanes essential to the process according to the invention may be used either alone or incombination with melamine- or urea formaldehyde resins which serve as hardeners for the hydroxyl group-containing polyacrylates. Urea formaldehyde resins are less commonly used since they generally have a deleterious effect on the resistance to weathering of the heat treated films. Those melamine formaldehyde resins which are methylated products of monomeric or oligomeric melamine hexamethylol methyl ether, are generally preferred owing to their good compatibility with polyacrylates. Since benzoguamine formaldehyde resins have little resistance to weathering although they also are readily compatible with polyacrylates, they are preferably used where superior resistance to chemicals is required. The poly-N-alkoxymethylurethanes used according to the invention in many cases impart a certain compatibility to the polyacrylates with the result that hydroxyl group-containing polyacrylates which are relatively incompatible in themselves will harden to produce clear, high gloss films with melamine resins which would otherwise not combine with them.

The addition of melamine formaldehyde resins as hardening components is not necessary. Whether the use of such resins is advantageous or not depends on the structure of the hydroxyl group containing polyacrylate used, the choice of poly-N-alkoxymethylurethane for cross-linking and the desired properties of the hardened film. When a strongly cross-linked poly-N-alkoxymethylurethane such as a reaction product of 3 mols of methoxymethylisocyanate with 1 mol of trimethylolpropane is used, it is advisable to use a very soft hydroxyl group-containing polyacrylate and to dispense with the use of melamine formaldehyde resins. If, however, a harder hydroxyl group-containing polyacrylate is used with the same N-alkoxymethyl urethane, the additional use of a melamine formaldehyde resin of the type melamine hexamethylol methyl ether may be desirable in order to obtain sufficient elasticity. Owing to the large number of readily accessible N-alkoxymethyl urethanes available, the expert can easily vary the properties of the polyacrylate films as desired, or can improve the properties of polyacrylate/melamine formaldehyde resin lacquers.

Although N-alkoxymethylurethanes will react satisfactorily with hydroxyl group-containing polyarcylates at elevated temperatures to form insoluble films, it is generally advisable to add acids which act as catalysts. The most effective acids for this purpose have proved to be, e.g., p-toluenesulphonic acid, phosphoric acid, tartaric acid, citric acid and pyromellitic acid, but acids which have been incorporated into the polyacrylate by polymerization, e.g., acrylic acid, methacrylic acid, maleic acid or maleic acid semi-ester, may also have a catalytic effect which is adequate. The additions, e.g., of 1% tartaric acid and/or 0.5% p-toluenesulphonic acid to solid polyacrylate generally causes the cross-linking reaction to proceed rapidly at temperatures of 120 to 140° C. Surprisingly, the combination of lacquer components used is completely stable in storage over several months at room temperature in spite of the addition of acid.

The storing temperature may be reduced in known manner by increased additions of strong acids although the lacquer compositions may then no longer be stable in storage over several months. The N-alkoxymethylurethane used according to the invention are liquid or solid substances, depending on the choice of starting components, and are generally readily soluble in the usual lacquer solvents such as alcohols, esters or glycol ether esters; although aromatic hydrocarbons are usually not true solvents, they can be used as blending agents.

The preparation of lacquers containing N-alkoxymethylurethanes as cross-linking components is carried out in known manner by dissolving or diluting the individual components in suitable solvents at diluents, grinding them with pigments and adding catalysts, auxiliary agents, etc. The addition of the cross-linking agents used according to the invention, either alone or together with a melamine formaldehyde resin, to the hydroxyl group-containing polyacrylate may also be carried out after incorporation of the pigment without thereby influencing the properties of the resulting films.

The alkoxymethylurethanes according to the invention are, of course, also fully effective in clear lacquers.

The following are examples of suitable solvents or diluents: Aromatic hydrocarbons such as toluene, xylene, chlorobenzene, carboxylic acid esters such as ethyl acetate, butyl acetate, b-methoxymethyl acetate, butyl glycollate, ketones such as methyl ethyl ketone, methyl isobutyl ketone cyclohexanone, alcohols such as ethanol, butanols, ethylene glycol, butylene glycols, ethylene glycol, monomethyl, ethyl and butyl ethers.

Mixtures of the above-mentioned solvents or diluents may also be used.

The following are examples of suitable pigments: Inorganic oxides such as titanium dioxide, chromium oxide, iron oxides, zinc oxide, mixed oxides or cobalt/nickel and manganese, and selenides and sulphides such as zinc sulphide, cadmium sulphide and cadmium selenide and in addition, chromates such as zinc chromate, lead chromate and strontium chromate. Furthermore, organic pigments such as phthalocyanine dyes, etc. may be used in the lacquers. The pigments may be blended in the usual manner with fillers such as silicic acids and silicates, barium sulphate and calcium sulphate and aluminum oxide.

In order to achieve special effects, the lacquers may contain an addition, for example, of aluminum bronzes.

Plasticizers comprising adipates and phthalates may be used as auxiliary agents.

The necessary additives to N-alkoxymethylurethanes depend on their functionality, i.e., on the number of NH—CH$_2$—O—R groups present per molecule and on the reactivity of the hydroxyl group containing polyacrylate and of the melamine formaldehyde compound which may also be present. Since, however, an excess or insufficiency has no marked influence on the properties of the hardened lacquer, a quantity of about 15 to 55% may generally be used. The optimum quantity to be added can easily be determined by preliminary tests, by testing the hardness and resistance to solvents of differently composed films.

A few examples are given hereinafter to characterize quantitatively the properties of films which have been produced with the use of N-alkoxymethylurethanes as cross-linking agents for hydroxy group-containing polyacrylates and in order to further describe the claimed process. The quantities given are parts by weight and unless otherwise indicated the substances were used in the undiluted form (approximately 100%).

The invention is further illustrated but is not intended to be limited by the following examples in which all parts and percentages are by weight unless otherwise specified.

EXAMPLE 1

(a) Preparation and description of starting materials.—The hydroxyl group-containing polyacrylate resin used is a commercial product obtained by peroxidic polymerization of styrene, ethyl acrylate, hydroxypropylmethacrylate, ethyl-hexyl acrylate and acrylamide in a 3:1 mixture of xylol and butanol. The product wherein the form of a 50% solution in 3:1 xylol/butanol, had an outflow time of 60″ through a 6 mm. nozzle (according to DIN 53211).

This polyacrylate resin will be termed hereinafter polyacrylate A. The cross-linking agent used was trimethylol propane-tri-methoxymethylurethane, which was obtained as follows:

About 134 parts of trimethylolpropane are melted by heating to about 70° C., and about 261 parts (3 mols) of methoxymethylisocyanate are added dropwise, with stirring, at 70 to 50° C. When the exothermic reaction has subsided the reaction is continued at about 50° C. until the isocyanate has reacted completely (after about 3 hours). The resulting trimethylolpropane-tri-methoxymethylurethane is a colorless viscous oil which slowly solidified on standing. This product will hereinafter be termed cross-linking agent I.

(b) Preparation and properties of a top coating lacquer for motor cars.—About 100 parts of polyacrylate A dissolved in about 115 parts of xylol and about 25 parts of butanol are ground in a ball mill with a pigment mixture consisting of about 6.42 parts of titanium dioxide (rutile), about 0.82 part of a lamp black, about 0.13 part of Helioechtgelb EBR (suppliers: Farbenfabriken Bayer AG), about 0.03 part of Permanent violet RL extra (Farbwerke Hoechst AG) and about 3.8 parts of Heliogenblau (Farbenfabriken Bayer AG). About 20 parts of cross-linking agent I and about 14 parts of a commercial melamine hexamethylol methyl ether are then added to the resulting stock paste, and the mixture is diluted with about 27 parts of butanol, and finally catalyzed with about 1 part of tartaric acid and about 0.5 part of p-toluenesulphonic acid.

The resulting lacquers are sprayed onto metal sheets and stoved for about 30 minutes at about 120° C.

For comparison, another lacquer is produced which has the same composition except that about 20 parts of cross-linking agent I are replaced by about 20 parts of a highly reactive commercial melamine formaldehyde resin. This lacquer is also sprayed onto metal sheets and stoved for about 30 minutes at about 130° C.

A test of some of the properties of the two lacquer films yields the following results:

| | Example 1 (with cross-linking agent I) | Comparison (with commercial melamine resin) |
|---|---|---|
| Layer thickness, µ | 40–50 | 40 |
| Hardness (determined by pencil hardness method very hard 6 H ... H, HB, B ... 6b very soft). | 3–4H | 2H |
| Elasticity in mm. depression according to Ericsson. | 7.7 | 7.6 |
| Gloss | (¹) | (¹) |
| Adhesion | (¹) | (¹) |
| Resistance to solvents:² | | |
| Ethyl acetate: | | |
| 1′ | U | 1- |
| 5′ | U | 2 |
| Ethylglycol acetate: | | |
| 1′ | U | U |
| 5′ | U | 1- |
| Toluene: | | |
| 1′ | U | U |
| 5′ | U | 1- |
| Premium blend petrol 15′ | U | 2 |

¹ Very good.
² Wads of cotton wool are steeped in the different solvents, placed on the surface of the latter and covered with a cup. The cotton wool is removed at the end of the given times (1′, 5′, 15′) and the surface hardness is immediately tested with a finger nail.

NOTE.—The meanings of the terms are as follows:
U = Unchanged.
1- = Between U and 1.
1 = Trace of softening.
2 = Distinctly softened.
3 = Slightly dissolved.
4 = Still completely soluble.

EXAMPLES 2–5

These examples are designed to show that the use of suitable N-alkoxymethylurethanes, which serve as cross-linking agents can increase the hardness and resistance to solvents of commercial polyacrylates without reducing the elasticity, and that the elasticity and, in particular, the impact strength can be increased without the hardness or resistance to solvents being impaired.

(a) Preparation of starting materials.—The hydroxyl group-containing polyacrylate resin used is again the polyacrylate A used in Example 1.

The various cross-linking agents are prepared as follows:

Cross-linking agent II

About 500 parts of a comercial polyester of hexanetriol, adipic acid and phthalic acid having an OH content of 8.8% are dissolved in about 725 parts of anhydrous xylol, and about 225 parts of methoxymethylisocyanate are added dropwise at about 50° C. The reaction mixture is stirred for about 5 hours at about 50° C. until complete.

Cross-linking agent III

A polyester amide of OH number 418 and acid number 0.9 is prepared in known manner by condensation of 3 mols of phthalic acid, 3 mols of adipic acid, 8 mols of trimethylol propane and 1 mol of ethanolamine.

About 1000 parts of the highly viscous oil are dissolved in about 549 parts of ethyl glycol acetate, and about 649 parts of methoxy methyl isocyanate are added dropwise at about 50 to about 60° C. The reaction is complete after about 6 hours.

Cross-linking agent IV

About 583 parts of methoxymethylisocyanate are added dropwise over a period of about 1½ hours to about 1000 parts of a polyether of trimethylolpropane and propylene glycol, which polyether has an OH content of 11.5%. The temperature is maintained at about 60° C., first by cooling and later by heating. To complete the reaction, stirring is continued for another 3 to 4 hours at 60 to 70° C.

Cross-linking agent V

About 174 parts (2 mols) of methoxymethylisocyanate are added dropwise, with stirring, to about 90 parts (1 mol) of butane-1,4-diol. The temperature of the exothermic reaction should not exceed about 60° C. Stirring is continued for a further 3 to 4 hours at 60 to 70° C. to complete the reaction. The resulting butanediol-1,4-bis-methoxymethylurethane has a melting point of 58 to 60° C.

(b) Preparation and properties of the lacquer.—Lacquers are prepared according to the following composition and are sprayed onto metal sheets and stoved for about ½ hour at about 130° C.

|  | Examples | | | | Comparison |
|---|---|---|---|---|---|
|  | 2 | 3 | 4 | 5 |  |
| Polyacrylate resin A | 100 | 100 | 100 | 100 | 100 |
| Cross-linking agent II | 30 |  |  |  |  |
| Cross-linking agent III |  | 30 |  |  |  |
| Cross-linking agent IV |  |  | 30 |  |  |
| Cross-linking agent V |  |  |  | 30 |  |
| Melamine hexamethylol methyl ether | 15 | 15 | 15 | 15 | 15 |
| Highly reactive melamine formaldehyde resin | 25 | 25 | 25 | 25 | 25 |
| Xylene | 130 | 130 | 130 | 130 | 100 |
| Butanol | 100 | 100 | 100 | 100 | 70 |
| Titanium dioxide (commercial rutile) | 70 | 70 | 70 | 70 | 70 |
| Tartaric acid | 1 | 1 | 1 | 1 | 1 |
| p-Toluenesulphonic acid | 0.5 | 0.5 | 0.5 | 0.5 | 0.5 |

The films had the following properties: (Elucidation of measuring data in Example 1).

|  | Examples | | | | Comparison without cross-linking agent |
|---|---|---|---|---|---|
|  | 2 | 3 | 4 | 5 |  |
| Layer thickness in $\mu$ | 40–50 | 45 | 40–50 | 35–45 | 35–45 |
| Hardness (pencil hardness) | 3–4H | 3H | 2H | 2–3H | 2–3H |
| Elasticity, mm.: |  |  |  |  |  |
| (Ericsson cupping) | 7.9 | 6.5 | 7.3 | 8.5 | 7.6 |
| Impact cupping, mm | 1.8 | 1.7 | 5.0 | 4.8 | 1.3 |
| Adhesion | (¹) | (¹) | (¹) | (¹) | (¹) |
| Resistance to solvents: |  |  |  |  |  |
| Ethyl acetate: |  |  |  |  |  |
| 1′ | U | U | 1- | 1- | 1- |
| 5′ | 1- | 1- | 3 | 2 | 3 |
| Ethyl glycol acetate: |  |  |  |  |  |
| 1′ | U | U | U | U | U |
| 5′ | U | U | 1- | 1- | 1- |
| Toluene: |  |  |  |  |  |
| 1′ | U | U | U | U | U |
| 5′ | U² | U² | 1-³ | 1-³ | 1- |

¹ Very good.
² Better resistance to solvents.
³ Better impact elasticity.

EXAMPLE 6

This example serves to show that N-alkoxymethylurethanes may be used as cross-linking agents in the preparation of hydroxyl group-containing polyacrylates, without the use of a melamine formaldehyde resin.

(a) Preparation of starting materials.—The product used as hydroxyl group-containing polyacrylate resin is similar in composition to the polyacrylate A described in Example 1 but it contains butyl acrylate instead of ethyl acrylate and is therefore considerably softer. (Hereinafter to be termed polyacrylate B.)

The cross-linking agent VI used is a hexanetriol-tris-methoxymethylurethane which was obtained as follows:

About 134 parts (1 mol) of hexanetriol are heated to about 40° C. and about 267 parts (3 mols) of methoxymethylisocyanate are added dropwise with stirring. During this addition, the temperature is maintained between 50 and 60° C. by cooling. Thereafter, the reaction mixture is stirred for about another 3 to 4 hours at the same temperature. About 401 parts of hexanetriol-tris-methoxymethylurethane are obtained as a colorless, viscous oil.

(b) Preparation and properties of the lacquer.—A white lacquer prepared by grinding about 50 parts of polyacrylate resin B, about 60 parts of xylene and about 35 parts of titanium dioxide (rutile) in a ball mill and cross-linking with about 20 parts of cross-linking agent VI, about 30 parts of xylol, about 30 parts of butanol and about 1 part of tartaric acid and about 0.5 part of p-toluenesulphonic acid is sprayed onto metal sheets and stoved for about ½ hour at about 130° C.

The lacquer film has the following properties:

Layer thickness—45$\mu$
Hardness ¹—3H
Elasticity ¹—7.8 mm.
Resistance to solvents ¹
Ethyl acetate:
    1′—U
    5′—1
Ethylglycol-acetate:
    1′—U
    5′—U
Toluene:
    1′—U
    5′—U ¹ See footnote to Example 1.

It is to be understood that the examples are for the purpose of illustration and not of limitation and that any of the hydroxyl containing polyacrylate resins, N-alkoxymethylurethanes, melamine formaldehyde resins, urea formaldehyde or solvents set forth throughout the specification may be used in equivalent quantities in place of those specifically used in the examples.

It is to be understood that any of the components and conditions mentioned as suitable herein can be substituted for its counterpart in the foregoing examples and that although the invention has been described in considerable detail in the foregoing, such detail is solely for the purpose of illustration. Variations can be made in the invention by those skilled in the art without departing from the spirit and scope of the invention except as is set forth in the claims.

What is claimed is:

1. A lacquer composition which comprises 15 to 35 parts by weight of a polyacrylate resin containing hydroxyl groups which is a copolymer of (a) acrylic acid esters having 1 to 12 carbon atoms, methacrylic acid alkyl esters having 1 to 12 carbon atoms and mixtures thereof and (b) hydroxypropyl acrylate, hydroxyethyl acrylate, hydroxypropyl methacrylate and hydroxyethyl methacrylate; 5 to 30 parts by weight of an N-alkoxymethylurethane which is a reaction product of a polyhydroxyl compound and an alkoxymethyl isocyanate of the formula $$ROCH_2—NCO$$

wherein R is an alkyl or alkylene radical having 1 to 12 carbon atoms, and 40 to 80 parts by weight of an organic solvent selected from the group consisting of an aromatic hydrocarbon, a carboxylic acid ester, a ketone or an alcohol.

2. The lacquer composition of claim 1 wherein monoolefins, aromatic vinyl compounds, arcrylamide or mixtures thereof are copolymerized into the polyacrylate resin.

3. The lacquer composition of claim 1 wherein up to 70% of the N-alkoxymethylurethane is replaced by a mealamine formaldehyde resin or a urea formaldehyde resin.

References Cited

UNITED STATES PATENTS

| 2,819,237 | 1/1958 | Daniel | 260—851 |
| 3,220,869 | 11/1965 | Ruemens et al. | 260—851 |
| 3,377,249 | 4/1968 | Marco | 260—851 |
| 3,415,768 | 12/1968 | Dieterich et al. | 260—851 |
| 3,442,843 | 5/1969 | Keberle et al. | 260—77.5AX |

JOHN C. BLEUTGE, Primary Examiner

U.S. Cl. X. R.

117—132, 161; 260—32.8, 33.4, 33.6, 39, 40, 75, 77.5, 847, 851, 856